(12) United States Patent
Miller

(10) Patent No.: US 6,384,929 B1
(45) Date of Patent: May 7, 2002

(54) SELF-ORIENTING PRINTER CONTROLLER FOR PRINTING ON THE NON-RECORDABLE LABEL FACE OF A COMPACT DISK

(75) Inventor: David Miller, Concord, CA (US)

(73) Assignee: Wordtech, Inc., Concord, CA (US)

( * ) Notice: Subject to any disclaimer, the term of this patent is extended or adjusted under 35 U.S.C. 154(b) by 0 days.

(21) Appl. No.: 09/099,077

(22) Filed: Jun. 17, 1998

(51) Int. Cl.[7] .............................................. G06K 15/00
(52) U.S. Cl. ....................................... 358/1.15; 358/1.5
(58) Field of Search ........................... 358/1.1, 1.3, 1.4, 358/1.5, 1.6, 1.9, 1.12, 1.15, 1.18; 400/70, 77, 120.16, 127, 130, 134; 53/411; 369/13, 34, 43; 347/1, 23, 27, 85, 86, 105, 129

(56) References Cited

U.S. PATENT DOCUMENTS

| 5,317,337 A | | 5/1994 | Ewaldt | |
|---|---|---|---|---|
| 5,509,991 A | * | 4/1996 | Choi | 156/245 |
| 5,518,325 A | | 5/1996 | Kahle et al. | |
| 5,542,768 A | | 8/1996 | Rother et al. | |
| 5,587,796 A | * | 12/1996 | Rakitsch et al. | 356/445 |
| 5,777,314 A | * | 7/1998 | Roustaei | 235/462.42 |
| 5,806,420 A | * | 9/1998 | Erhard et al. | 101/37 |
| 5,854,175 A | * | 12/1998 | DeBoer et al. | 503/227 |
| 5,902,446 A | * | 5/1999 | Casillo et al. | 156/379.8 |
| 5,914,918 A | | 6/1999 | Lee et al. | |
| 5,950,401 A | * | 9/1999 | Blohm et al. | 53/411 |
| 5,967,676 A | | 10/1999 | Cutler et al. | |
| 6,019,151 A | * | 2/2000 | Wen et al. | 156/387 |
| 6,020,977 A | * | 2/2000 | Kim | 358/1.7 |

* cited by examiner

Primary Examiner—Gabriel Garcia

(57) ABSTRACT

A disk printer controller for controlling a disk printer in the application of a printed image to the non-recordable label face of a compact disk, the disk printer controller having a scanning assembly and an electronic control system for controlling the sequence of operations of scanning and printing. The electronic control system includes a host computer and computer software connected to the scanning assembly. Prior to the printing operation, the scanning assembly scans a portion of the label face of the compact disk, and the disk orientation relative to the printer is calculated. The image is rotated and adjusted in computer memory and is finally sent to the disk printer for application on the non-recordable label face of the disk at the proper location and angle.

10 Claims, 4 Drawing Sheets

SELF-ORIENTING PRINTER CONTROLLER FOR PRINTING ON THE NON-RECORDABLE LABEL FACE OF A COMPACT DISK

BACKGROUND OF THE INVENTION

This invention relates to a printer controller for controlling a printing device for storage media. In particular, the printing device is a printer that applies a printed image onto the non-recordable label face of a compact disk. This invention can be added to an existing disk printing device, the disk printing device used in stand-alone mode or in conjunction with a CD-R disk recording device.

As computers and consumer electronic products have evolved to handle greater capacities of data, the storage medium for recording data or information generated has similarly evolved. The optical disk has become an inexpensive medium on which to record a large volume of data. It is now commonplace for computer programs or data collections to be copied onto compact discs because of the low cost of production for the producer and the ease of data installation and use by the consumer.

While high volume data reproduction is typically accomplished by pressing disks using specialized equipment, it is often advantageous for smaller runs, usually no larger than approximately 1000 copies, to be made using CD-R recording equipment. Use of CD-R disks and recording equipment allows producers to make small production runs quickly while retaining complete control over the copying process.

A major obstacle to the data recording process is no longer the placement of binary data onto the disk itself, but the proper identification and labeling of disks after the copy process so that the user can distinguish one disk from another. It is now possible to purchase disk printers that print on the non-recordable label face of a compact disk using inkjet or thermal printing technology. However, these printing methods are often more expensive than a silk screen printing process, add a significant amount of time to the entire replication process, and lead to disks having labels that look shoddy in comparison to a silk screened label.

Many of these disadvantages could be eliminated through a hybrid printing method whereby a disk printer is used to apply customized labels to disks that have been pre-printed with a silk screened label. For example, a company could have its product logo or trademark silk screened onto a set of disks, and then could print a customized image such as a serial number or a version identifier onto the disk.

Such a hybrid printing method would require that the disk be properly aligned with the printer so that the label is applied with the correct location and orientation. Using traditional disk printing equipment, a user can only accomplish this task by manually aligning and inserting disks into a disk printer, thereby adding a large labor cost and the likelihood of human error into the process. One manufacturer has proposed a device that rotates the disk for proper alignment before printing. This solution requires that an additional motor and carriage be incorporated into the printer, adding additional weight, expense, and increasing both the probability and cost of repair.

It is an object of this invention to provide image application to a set of disks, with each disk having pre-printed information on the non-recordable label face of the disk. It is a further object of this invention to construct a scanning and printing apparatus that accomplishes the scanning operation in a time-efficient manner with a minimal amount of additional machinery. Yet a further object of this invention is to incorporate the automated labeling process into pre-existing disk printer systems at minimal cost. It is a further object of this invention to incorporate the automatic image application into a CD-R disk writer and allow for the customization of image application, while minimizing the amount of human labor necessary.

SUMMARY OF THE INVENTION

The disk printer controller of this invention is designed for those operations where a modest number of compact disks are to be custom labeled. Although the disk printer controller is primarily designed to operate in conjunction with a CD-R disk writer system, the printing system can be used for any recording media analogous to CD-R disks, such as pressed compact disks or digital video disks. Because of the clever physical arrangement of the hardware used to accomplish the scanning process, it is expected that ordinary disk printers and disk writers will be easily modified to incorporate the disk printing system of this invention; therefore, any references to a particular disk printer or copier should not be considered as a limitation to practicing the invention disclosed herein.

The disk printer controller has a scanning assembly and an electronic control means for controlling the sequence of scanning and printing. The electronic control means comprises a personal computer or controller board that may be incorporated within the housing of the printer unit or maintained separate therefrom. It is likely that users desiring to control the image application process will operate a computer, video monitor, and peripheral input devices to design or prepare one or more custom image files used for printing.

In the first embodiment of the disk printer controller, the disk printer controller is attached to a stand-alone disk printing unit. Contained within the computer or controller board is a set of computer software programs that operate the various mechanical components utilized to accomplish the following tasks:

1. engage the scanning assembly to scan the non-recordable label face of each disk transported into the disk printer;
2. rotate and adjust the custom image file to its proper location and angle relative to the non-recordable label face of the disk placed inside the disk printer; and
3. operate the disk printer and apply the processed custom image file to the non-recordable label face of the disk placed inside the disk printer.

In the second embodiment of the disk printer controller, the disk printer controller is connected to a printing unit operated in conjunction with a CD-R disk writer. Contained within the computer or controller board is a set of computer software programs that operate the various mechanical components utilized to accomplish the following tasks:

1. load and unload disks from disk drive members contained in the disk writer;
2. issue copying and verification commands to the disk writer;
3. transport disks to the disk printer;
4. load and unload disks from the disk printer;
5. engage the scanning assembly to scan the non-recordable label face of each disk transported into the disk printer;
6. rotate and adjust the custom image file to its proper location and angle relative to the non-recordable label face of the disk placed inside the disk printer; and 7. activate the disk printer and apply the processed custom image file to the non-recordable label face of the disk placed inside the disk printer.

In the first embodiment, a serial connection connects the host computer and the scanning assembly, and a parallel printer interface connects the host computer to the disk printer. In the second embodiment, a second connection using an electrical relay between the host computer and the disk printer may be necessary to control transfer of CD-R disks from the disk writer to the disk printer.

Each embodiment of the disk printer controller is designed for use with a disk printer having a retractable disk tray that extends outward from the disk printer to accept a disk for printing. Once a disk has been placed on the extended disk tray and an electrical or mechanical signal is activated, the disk tray retracts, and the disk travels inside the disk printer and underneath a printing element such as a thermal or inkjet printhead.

In each embodiment of the disk printer controller, the scanning assembly is placed directly above the travel path of the disk tray as it retracts from its extended position. The scanning assembly has a scan line that is perpendicular to the movement of the disk tray and has a focus on a plane corresponding to the plane formed by the non-recordable label face of a compact disk inserted on the disk tray.

The scanning assembly resembles what is known in the prior art as a half-page scanner; the scanning assembly has a set of light emitting diodes (LEDs) positioned parallel to the scan line for illumination of the compact disk, an optional set of mirror elements, a lens assembly, and a charge coupled device ("CCD") sensor arranged on a printed circuit board. Light from the LEDs reflects off of the non-recordable label face of the compact disk and travels into the lens assembly to be focused onto the CCD sensor. Depending on the desired physical configuration of the scanning assembly, the light reflected off of the label face of the compact disk may be reflected by one or more mirror elements prior to its entering the lens assembly.

Data from the CCD sensor is sent to signal processing software located on the host computer for assembly into a bitmap image file. Depending on the amount of sophistication required by the user, one of two scanning methods is employed. In the first method, the scanning region corresponds to a small area around the center aperture of the compact disk. In the second method, the ire scanning region corresponds to the complete label face of the compact disk.

In the first method, disk orientation is calculated from a small dot imprinted on the label face of the disk near the center aperture of the disk. This dot is applied to the disk to provide a reference to the pre-printed material placed on the label face of the disk. Using this method, the disk orientation can be determined quickly using a small bitmap image file corresponding to a scan of the label face of the disk near the center aperture of the disk.

In the second method, the scanned bitmap image file represents the image of the complete label face of the disk. This image file is then compared to a reference bitmap image file to determine the relative angle of rotation of the disk to the reference bitmap image file. While this second method is more complex than the first method and thus inherently slower to accomplish, it allows for the disk orientation to be calculated without the use of special reference marks placed on the disk near the central aperture of the disk.

After the disk orientation is calculated, a processed custom image file is created by rotating and filtering the desired label image file. The processed custom image file is then ready to be sent as a set of printing commands to the disk printer, and the processed custom image is applied to the label face of the disk. These and other features will be described in greater detail in the detailed description of the preferred embodiments.

DETAILED DESCRIPTION OF THE PREFERRED EMBODIMENTS

Figure 1:
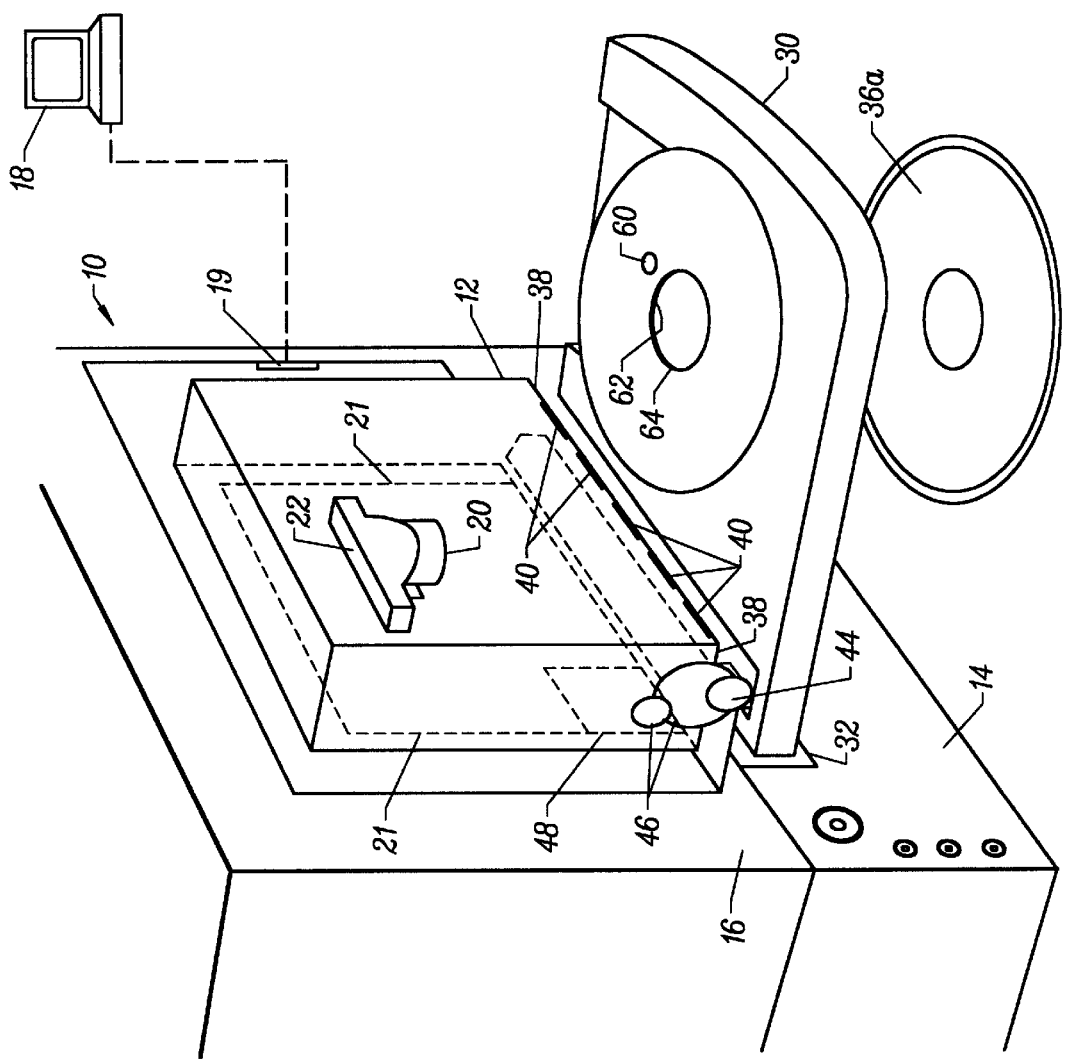
FIG. 1 is a perspective cut-out view of the first embodiment of the disk printer controller affixed to a stand-alone disk printer, the disk printer controller having a host computer.

Referring to FIG. 1, the disk printer controller of this invention is designated generally by the reference numeral 10. The disk printer controller 10 has a scanning assembly 12, a first serial connection 19 connected to a host computer 18. The scanning assembly 12 is affixed to a disk printer 14 along the front face 16 of the disk printer 14 and encloses a lens assembly 20, a scanner circuit board 21, a charge coupled device 22, and one or more optional mirror members 24 (one shown in FIG. 2).

The disk printer 14 is of standard design and has a retractable disk tray 30 that travels horizontally through a disk printer aperture 32. In FIG. 1, the retractable disk tray 30 is shown in its extended position and has a top face 34 that receives and holds a compact disk 36 for insertion into the disk printer 14. A parallel port connector 100a (not shown in FIG. 1) on the disk printer 14 allows a data and signal connection to a parallel port connector 100b (not shown) on the host computer 18.

The bottom of the scanning assembly 12 has an aperture 38 positioned directly above the disk printer aperture 32 forming an enclosed space in the region above the scanning assembly aperture 38 so that light reflections off the compact disk 36 as it passes under the scanning assembly aperture 38 travel upward inside the bottom of the scanning assembly 12. A set of light emitting diode members 40 are positioned on the inside wall 38 of the scanning assembly aperture 38 and illuminate the label face of the compact disk 36 as it passes underneath the scanning assembly aperture 38.

Proper construction of an image file by a scanner requires a timing circuit or substitute to provide a reference to the electrical signal generated by the charge coupled device. The reference signal can be generated using hardware typically found on a half-page scanner. As illustrated in FIG. 1, for example, a wheel 44 can be affixed to the scanning assembly aperture 38 to make physical contact with the retractable disk tray 30 and rotate as the retractable disk tray 30 retracts into the disk printer 14. The wheel 44 would rotate one or more gear members 46 that provide input to a timing circuit 48.

An alternative to using hardware to generate a reference signal comprises measuring the speed of the retractable disk tray 30 as it carries a reference compact disk 36a underneath the scanning assembly aperture 38. This can be accomplished using a software program where the reference compact disk 36a is marked along its perimeter.

Figure 2:
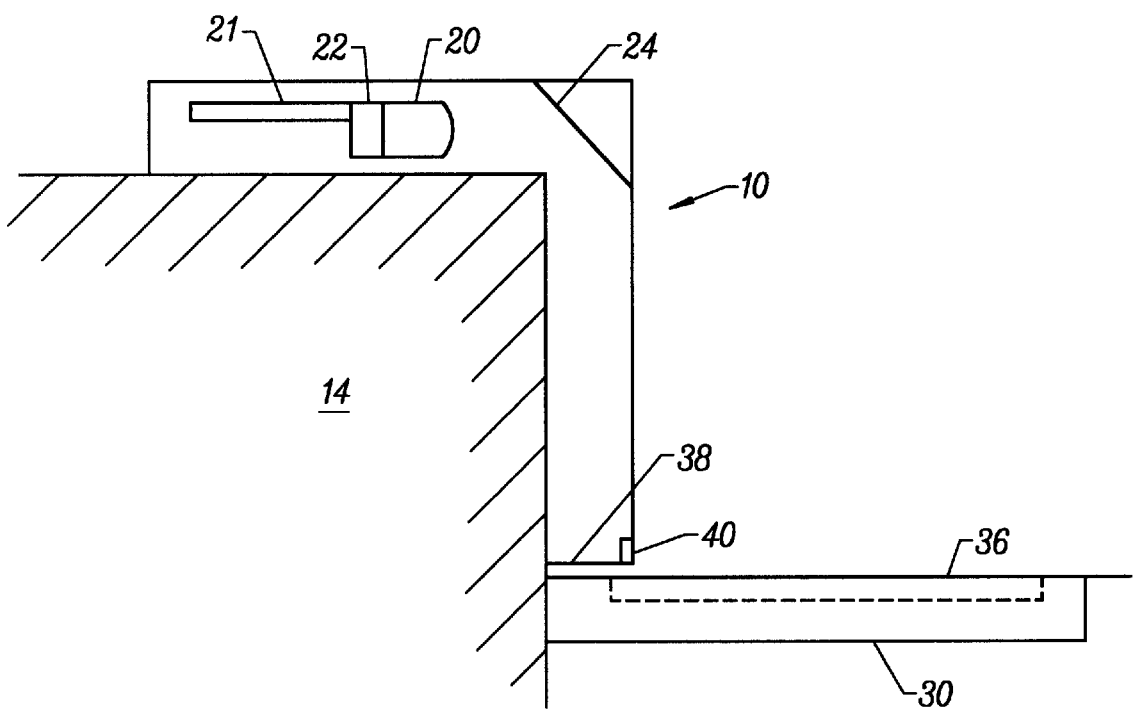
FIG. 2 is a schematic side view of an alternate embodiment of the disk printer controller affixed to a stand-alone disk printer, the disk printer controller having a mirror member 24 to reflect light rays 45 degrees before entering the lens assembly.

In FIG. 1, light rays reflected off of the label face of the compact disk 36 and travel inside the bottom of the scanning assembly 12 then enter the lens assembly 20 for focusing on the charge coupled device 22. It is to be understood that depending on the physical constraints in the region surrounding the disk printer 14, the scanning assembly may contain one or more additional mirror members, or no mirror members whatsoever. A schematic view of a scanning assembly 12 containing one mirror member 24 is illustrated in FIG. 2.

The lens assembly 20 and charge coupled device 22 are commonly found in scanners and digital cameras and form a sealed unit. While in conventional scanners the charge coupled device 22 is usually directly affixed to a scanner circuit board 21, it is to be understood that in the scanning assembly 12 the charge coupled device and scanner circuit board 21 can be physically separated and connected by an electrical connection (not shown) in order to allow for placement of the scanner circuit board 21 in a location along the disk printer assembly 14 or outside the disk printer assembly 14, as illustrated in FIG. 2, for example. The scanner circuit board 21 converts the electrical signals generated by the charged coupled device 20 into a signal sequence corresponding to pixels.

Electrical signals generated by the scanner circuit board 21 are transmitted serially through the first serial connection 19, such as an RS-232 connection, to the host computer 18; however, if faster data throughput is desired, the serial connection can be replaced with a SCSI connection with the appropriate modifications to the scanner circuit board 21 and the host computer 18.

Figure 3:
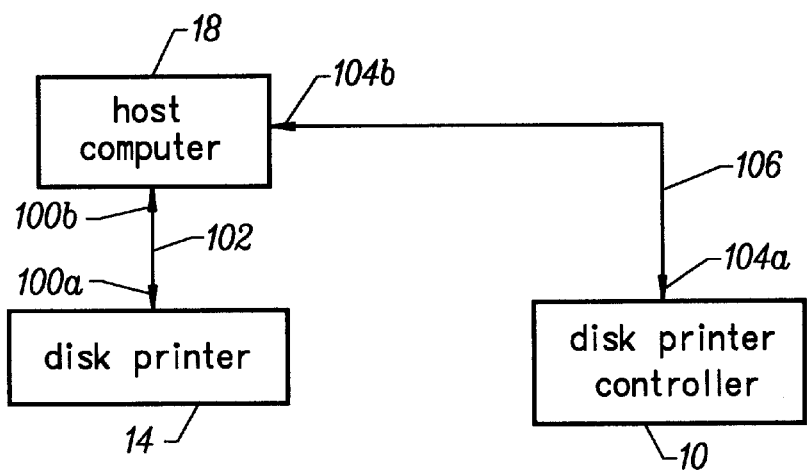
FIG. 3 is a schematic view of the electrical connections between the disk printer controller, the host computer, and the disk printer for the stand-alone disk printer of FIG. 1.

FIG. 3 better illustrates schematically the data connections between the disk printer controller 10, the stand-alone disk printer 14, and the host computer 18. A standard parallel data cable 102 connects the host computer 18 to the disk printer 14 using parallel port connectors 100a and 100b. Both (1) printing instructions are sent from the host computer 18 to the disk printer, and (2) printer status flags are sent from the disk printer 14 to the host computer 18, through the parallel data cable 102.

A standard serial cable 106 connects the disk printer controller 10 to the host computer 18 using RS-232 serial connectors 104a and 104b. Image data is sent from the disk printer controller 10 to the host computer 18 through the serial cable 106. Likewise, status flags are sent from the host computer 18 to the disk printer controller 10 through the serial cable 106.

Figure 4:
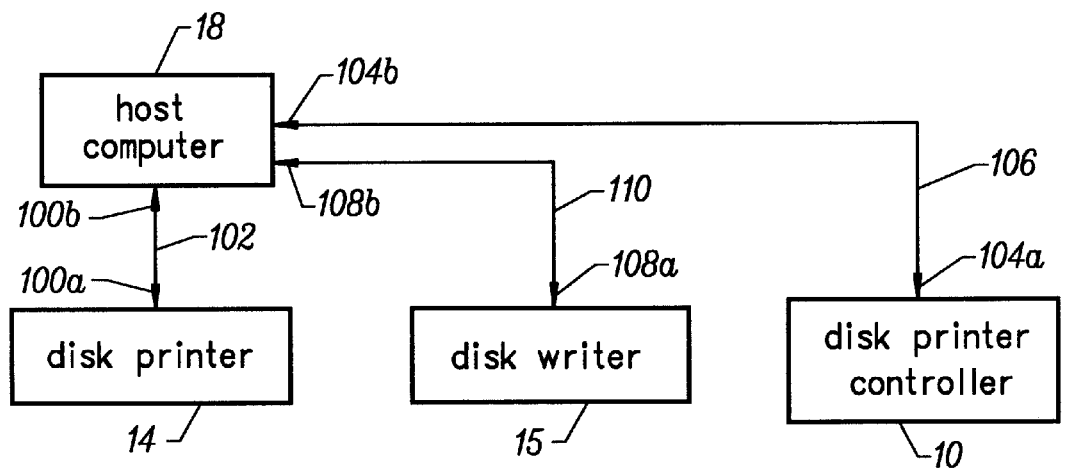
FIG. 4 is a schematic view of the electrical connections between the disk printer controller, the host computer, the disk printer, and a disk writer when the disk printer controller is used in conjunction with a disk writer.

FIG. 4 better illustrates schematically the data connections between the disk printer controller 10, the disk printer 14, the host computer 18, and an additional disk writer 15 that transports CD-R disks to the disk printer 14 after data is written on a CD-R disk. Along with the connections described in FIG. 3, a second serial cable 110 connects the host computer 18 to the disk writer 15 using RS-232 serial connectors 108a and 108b. Disk writing commands and data are sent through the second serial cable 110. FIG. 4 also details an optional electrical or data connection 112 between the disk printer 14 and the disk writer 15; this connection may comprise an electrical relay that relates disk printer status information directly to the disk writer 15, thereby bypassing the host computer 18.

Figure 5:
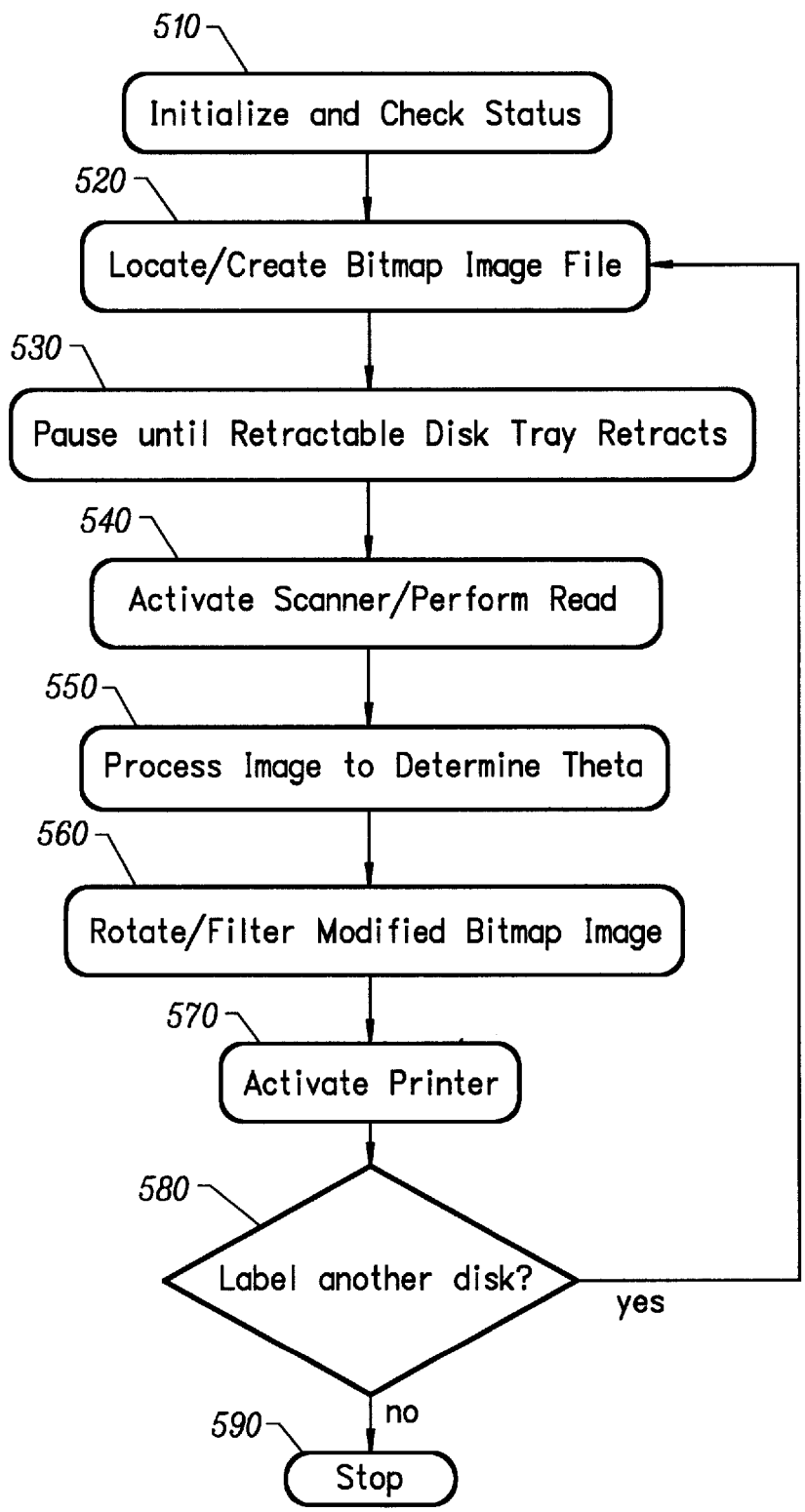
FIG. 5 is a flowchart diagram of computer software residing on the host computer that directs the scanning and printing operations.

Operation of the disk printer controller 10 when used in conjunction with a stand-alone disk printer 14 is accomplished by a set of computer programs residing on the host computer 18 corresponding to the flowchart illustrated in FIG. 5.

In FIG. 5, item step S10 corresponds to the initialization of the software, sending electrical power to the scanning assembly 34, and performing hardware status checks, if necessary. The computer software then loops through item steps S20 through S80, with execution of each loop corresponding to the application of a label on a single compact disk 36.

In item step S20, the computer software locates or constructs the appropriate bitmap image file that is to be placed on the compact disk 36. The bitmap image file could be manually specified by the user, or could be automatically generated, as in the case where compact disks are to be labeled with sequential identifiers.

Once the appropriate bitmap image file is located or constructed, the computer software pauses, as indicated in item step S30, until a compact disk 36 is loaded onto the retractable disk tray 30. The retractable disk tray 30 can be loaded manually by the user when the disk printer 14 is used as a stand-alone printer, or the retractable disk tray 30 can be loaded automatically when the disk printer controller is used in conjunction with a disk writer, such as CopyPro model CD-R 5000.

When the disk printer controller 10 is used in conjunction with a stand-alone disk printer 14, control of the computer software transfers from item step S30 to S40 upon a signal generated either by the software user interface or by the disk printer 14. A signal sent by disk printer 14 is sent from the parallel port connection 100a to the parallel port connection 100b on the host computer 18.

Upon the hardware or software activation of the retractable disk tray 30, the scanning assembly 12 is engaged, and the reflected image of the compact disk 36 is converted into a bitmap image file and sent to the host computer 18 through serial connection 19, as indicated in item step S40. In item step S50, a computer subroutine processes the bitmap image file to output a reference angle theta equaling the clockwise angle of rotation of a disk label reference identifier as compared to a compact disk that is orientated properly with respect to the disk printer 14.

In the preferred embodiment, the reference disk label identifier is a dot 60 that is placed close to the edge 62 of the center aperture 64 of the compact disk 36. One of many available software packages can be used to locate the pixels corresponding to the dot in the bitmap image file and then calculate the reference angle theta. For example, if the region surrounding the center aperture of the compact disk is clear and corresponds to bitmap image file regions containing zeros, a calculation of the center of the dot would correspond to a well-known center-of-mass calculation found in elementary physics textbooks.

In an alternate embodiment, item step S50 is accomplished using the bitmap image file corresponding to the complete reflected image of the compact disk 36. This method is feasible when the compact disk 36 has a pre-printed label face displaying an image having a definite orientation. The calculation of the reference angle theta then becomes a pattern matching comparison between the scanned bitmap image file and a reference bitmap image file, and can be accomplished using Fourier analysis in conjunction with commercially available software such as the Impuls Vision XL/XXL image processing and analysis system.

After completion of the calculation of the reference angle theta, the computer software then rotates and adjusts the custom image file to produce a processed custom image file, as indicated in item step S60. The computer software then sends the appropriate printing commands to the disk printer 14 to imprint the processed custom image file onto the compact disk 30, as indicated in item step S70. Upon completion of the printing operation, control of the computer software transfers to item step S80 and loops back to item step S20 if another disk is to be labeled. After all disks have been imprinted, control of the computer software transfers out of the loop described in item steps S20 through S80, and the computer program powers down all hardware and stops, as indicated in item step S90.

What is claimed is:

1. A self-orienting disk print controller system for controlling operations of a stand-alone disk printer unit and imprinting an image at a selected location and angle relative to a referenced identifier on a non-recordable label face of a compact disk having a center aperture, the self-orienting disk print controller system being connected to the stand-alone disk printer unit having a retractable disk tray, the self-orienting disk printer controller system comprising:
    a scanning assembly affixable to the stand-alone disk printer unit, the scanning assembly having:
        a lens assembly, the lens assembly having a focus plane corresponding to a plane of the non-recordable label face of the compact disk loaded on the retractable disk tray wherein the reference identifier is on the non-recordable label face proximate to the center aperture of the disk;
        a charge coupled device for converting an image created by the lens assembly into an electrical signal;
        a circuit board, the circuit board converting the electrical signal from the charge coupled device into a bitmap image file; and,
    electronic control means electrically connected to the circuit board and the stand-alone disk printer unit, the electronic control means having a set of computer software programs that accomplish the following steps:
        (a) activating the scanning assembly to scan the non-recordable label face of each compact disk transported into the stand-alone disk printer unit at least in a region surrounding the center aperture of the compact disk;
        (b) creating a processed image by rotating and adjusting the image to be printed to the selected location and angle relative to the reference identifier on the non-recordable label face of the compact disk placed inside the stand-alone disk printer unit; and
        (c) operating the stand-alone disk printer unit and applying the processed image to the non-recordable label face of the compact disk placed inside the stand-alone disk printer unit.

2. The self-orienting disk print controller system of claim 1 wherein the electronic control means comprises a controller card.

3. The self-orienting disk print controller system of claim 1 wherein the electronic control means comprises a programmable computer.

4. The self-orienting disk print controller system of claim 3 wherein the computer software programs create the processed image by locating the reference identifier wherein the reference identifier is a mark pre-printed on the non-recordable label face of the compact disk.

5. The self-orienting disk print controller system of claim 3 wherein the computer software programs create the processed image by comparing a reference bitmap image file to a bitmap image of at least the region of the non-recordable label face surrounding the center aperture of the compact disk inserted in the stand-alone disk printer unit.

6. A self-orienting disk print controller system controlling operations of a disk printer unit and imprinting an image onto a non-recordable label face of a compact disk, wherein the compact disk has a center aperture with an edge and the non-recordable label face has a reference identifier located close to the edge of the center aperture, the self-orienting disk print controller system connected to the disk printer unit having a retractable disk tray, the disk printer unit electronically connected to a disk writer, the self-orienting disk print controller system comprising:
    a scanning assembly affixed to the disk printer unit, the scanning assembly having:
        a lens assembly, the lens assembly having a focus plane corresponding to a plane of the non-recordable label face of the compact disk loaded on the retractable disk tray;
        a charge coupled device for converting an image created by the lens assembly of at least a region of the non-recordable label face surrounding the center aperture into an electrical signal;
        a circuit board, the circuit board converting the electrical signal from the charge coupled device into a bitmap image file; and,
    electronic control means electronically connected to the circuit board, the disk printer unit, and the disk writer, the electronic control means having a set of computer software programs to accomplish the following steps:
        (a) controlling the transport of the compact disk from the disk writer onto the retractable disk tray of the disk printer unit;
        (b) engaging the scanning assembly to scan at least the region of the non-recordable label face surrounding the center aperture of each compact disk transported into the disk printer unit;
        (c) creating a processed image by rotating and adjusting the processed image to its proper location and angle relative to the reference identifier on the non-recordable label face of the compact disk placed inside the disk printer unit; and
        (d) operating the disk printer unit and applying the processed image to the non-recordable label face of the compact disk placed inside the disk printer unit.

7. The self-orienting disk print controller system of claim 6 wherein the electronic control means comprises a controller card.

8. The self-orienting disk print controller system of claim 6 wherein the electronic control means comprises a programmable computer.

9. The self-orienting disk printer controller system of claim 8 wherein the computer software programs create the processed image by locating the reference identifier, wherein the reference identifier comprises a reference mark pre-printed on the non-recordable label face of the compact disk.

10. The self-orienting disk print controller system of claim 8 wherein the computer software programs create the processed image by comparing a reference bitmap image file to a bitmap image file of at least the region of the non-recordable label face surrounding the center aperture of the compact disk inserted in the stand-alone disk printer unit.

* * * * *